Figure 1:
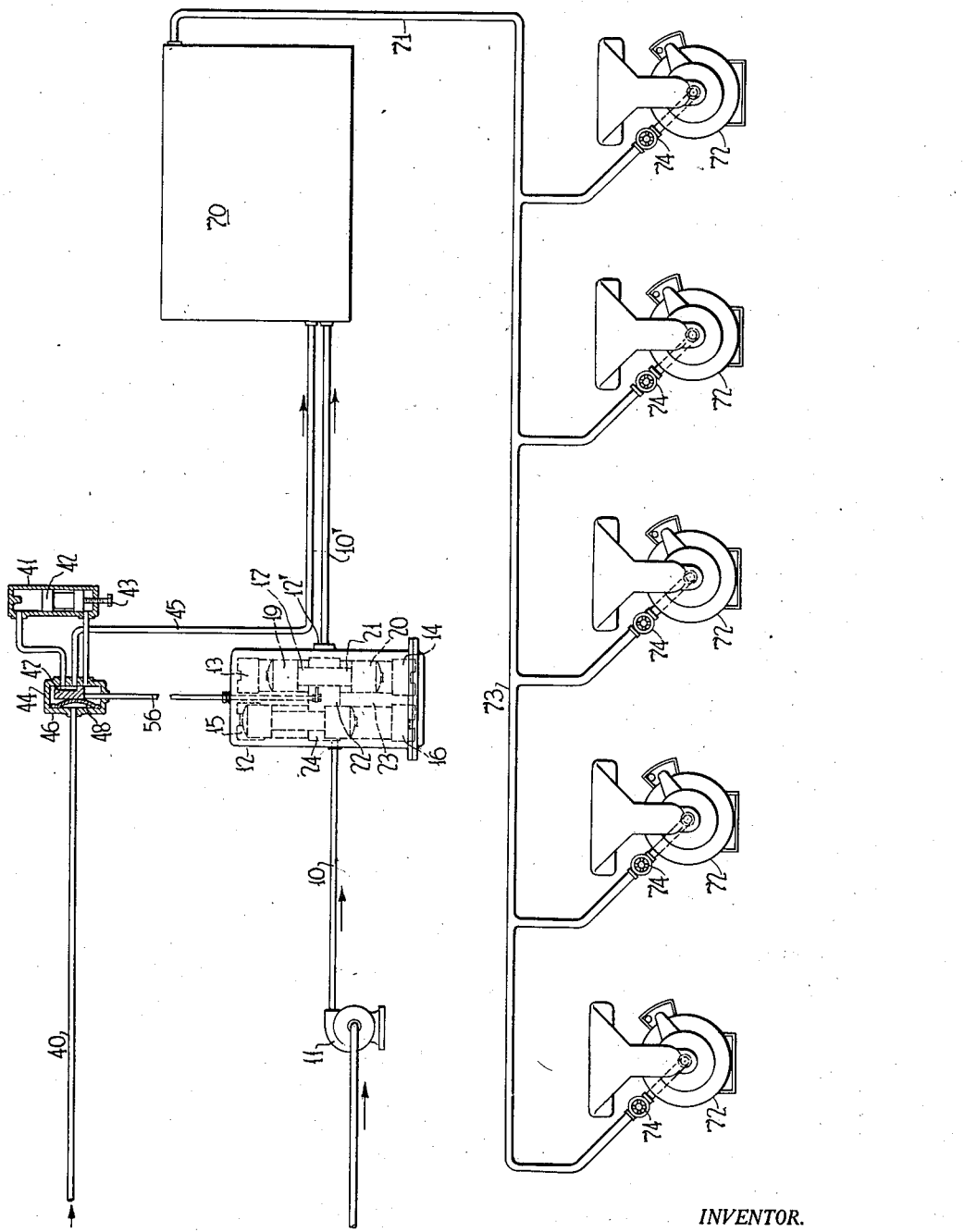

March 31, 1936.　　　　L. D. JONES　　　　2,035,655
CONTINUOUS PROCESS OF CHEMICALLY TREATING PETROLEUM OIL
Filed May 15, 1933　　　3 Sheets-Sheet 1

INVENTOR.
Leo D. Jones
BY Maurice A. Crews
ATTORNEY.

March 31, 1936.  L. D. JONES  2,035,655
CONTINUOUS PROCESS OF CHEMICALLY TREATING PETROLEUM OIL
Filed May 15, 1933  3 Sheets-Sheet 2
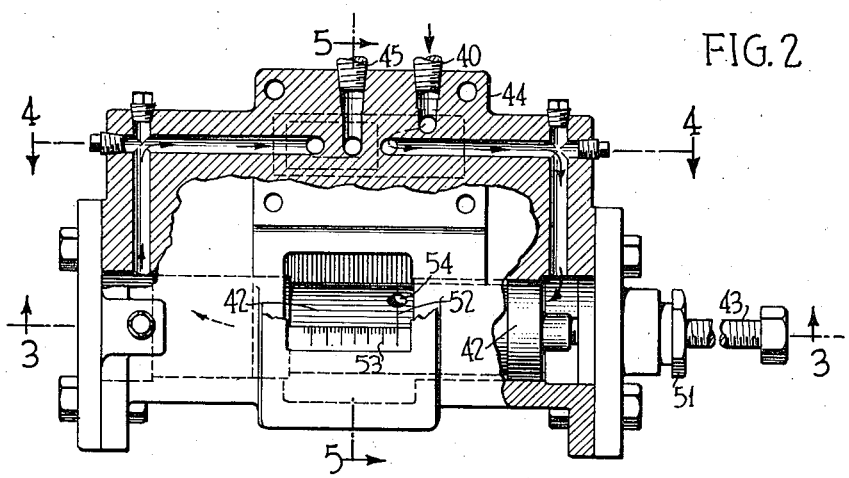
FIG. 2
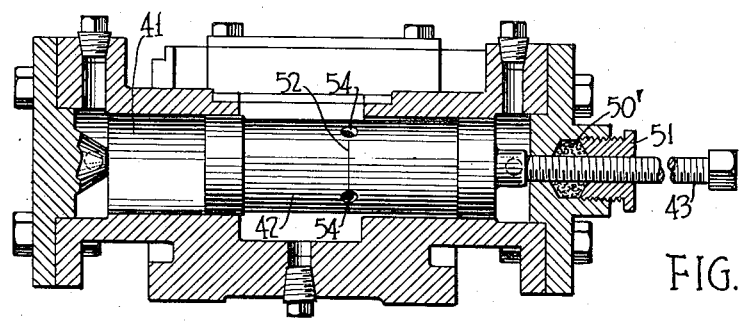
FIG. 3
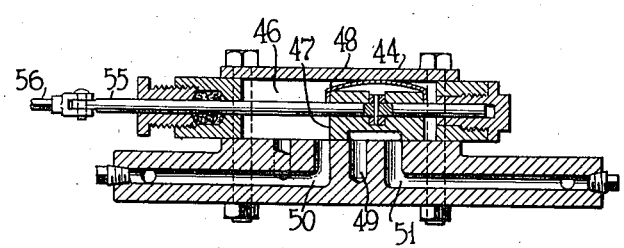
FIG. 5
FIG. 4
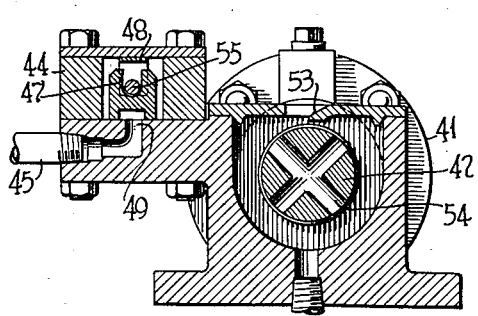
INVENTOR.
Leo D. Jones.
BY *Maurice R. Crews*
ATTORNEY.

March 31, 1936. L. D. JONES 2,035,655
CONTINUOUS PROCESS OF CHEMICALLY TREATING PETROLEUM OIL
Filed May 15, 1933   3 Sheets-Sheet 3

INVENTOR.
Leo D. Jones
BY Maurice A. Crews
ATTORNEY.

Patented Mar. 31, 1936

2,035,655

UNITED STATES PATENT OFFICE 2,035,655

CONTINUOUS PROCESS OF CHEMICALLY TREATING PETROLEUM OIL

Leo D. Jones, Philadelphia, Pa., assignor to The Sharples Specialty Company, Philadelphia, Pa., a corporation of Delaware Application May 15, 1933, Serial No. 671,064

1 Claim. (Cl. 196—40)

The present invention pertains to the chemical treatment of petroleum lubricating oil stocks. It has long been customary to treat such oils with sulphuric acid to effect the removal of coloring bodies and other undesired constituents, the oil being agitated in large batches with acid and then allowed to stand for a considerable period of time in order to separate the sludge formed by the acid treatment from the sour oil by the process of gravity settling.

Such a process possesses numerous disadvantages, among which may be mentioned the undesired chemical reactions caused by the long contact between the oil and acid and the large amount of equipment and space required for the treatment.

Continuous processes have been heretofore proposed in connection with the practice of such acid treatment and the subsequent separation of the constituents. Thus, it has been proposed to continuously mix the oil with sulphuric acid in relatively small volumes and to follow such mixing by prompt and continuous centrifugal separation of the sour oil from the sludge. In every such proposal of which I am aware, however, the provisions for proportioning the ingredients and mixing them have been so inadequate as to constitute serious obstacles to its commercial adoption.

It has been an object of this invention to evolve a process for continuously effecting the chemical treatment of petroleum oils in which the oil under treatment and the chemical used for such treatment are intimately intermixed and retained in such intimate admixture in accurately controlled volumes for a brief period of time sufficient to effect the desired reaction but short enough to avoid the danger that such reaction may take an undesired course, and thereafter promptly centrifugally separating the sludge formed from the oil. To this end the invention involves the feed of the acid and oil to a high speed mechanical mixing device in volumetrically proportioned amounts and the application of violent mechanical agitation to the oil and acid in that mixer for a period of time sufficient to obtain the desired intimacy of mixing and maintain that intimacy until the reaction has reached its most favorable stage, the treated oil being then promptly passed to a continuously operating centrifuge or battery of such centrifuges.

In order to effect the desired proportioning, the volume of one of the constituents fed to the mixer is determined by the volumetric displacement of a metering device forming a part of the feeding system for the other constituent. Thus, in the preferred embodiment of the invention, a displacement meter in the oil feed line drives a controlling or feeding apparatus in the acid feed line to accurately proportion the relative volumes of these constituents which reach the mixer. In the embodiment illustrated in the drawing this proportioning is effected by feeding the constituents in successive volumetrically proportioned increments to the mixer, the feed of every particle of oil or acid reaching this mixer effecting or being caused by the volumetric displacement of positively displaced intercontrolled members in the two feeding systems.

The detailed features of the invention will be better understood by reference to the attached drawings which illustrate a preferred form of mechanism adapted to be used in its practice. Features of this mechanism pertaining to the feeding system are illustrated and claimed in my co-pending application Serial No. 603,152, filed April 4, 1932, and an alternative form of feeding mechanism which is also adapted to operate in accordance with the principles of the present invention is likewise illustrated and claimed in my co-pending application Serial No. 636,167, filed October 4, 1932. The present application is a continuation in part of the first above-mentioned application and of the joint application of Leo D. Jones and Edward M. James, Serial No. 520,466, filed March 5, 1931, and which has matured into Patent No. 2,005,342, June 18, 1935.

Figures 6, 7:
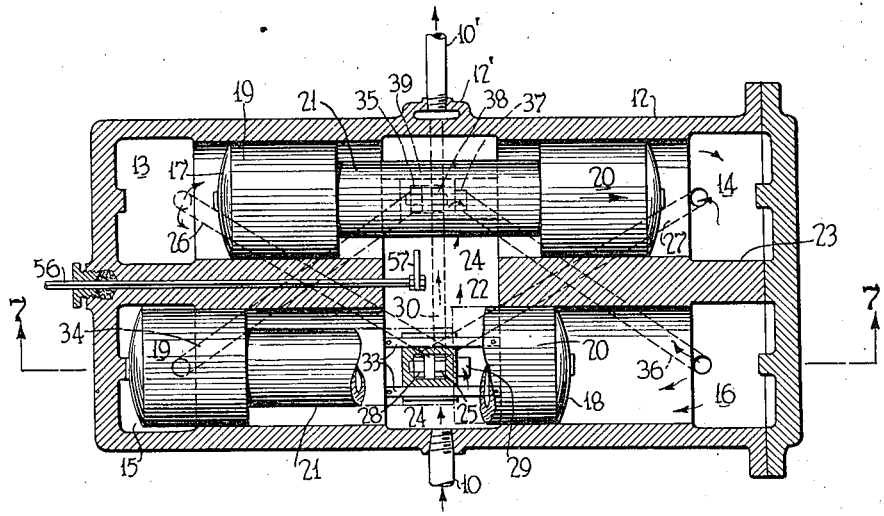

Referring to the drawings by reference characters,

Figure 1 is a diagrammatic view, partly in side elevation and partly in plan, illustrating the arrangement of the system, Fig. 2 is a view, partly in side elevation and partly in section, of a measuring cylinder suitable for use in the apparatus of Fig. 1, Fig. 3 is a section on the line 3—3 of Fig. 2, Fig. 4 is a section on the line 4—4 of Fig. 2, Fig. 5 is a section on the line 5—5 of Fig. 2, Fig. 6 is a horizontal sectional view of the mechanism shown in Fig. 1 for use as a positive displacement meter in the oil feed line, and Fig. 7 is a sectional view on the line 7—7 of Fig. 6.

The system involves, in general, separate sources of supply from which the oil and acid are fed to a mixing chamber. Both oil and acid may be fed by constant pressure impelling apparatus and the oil is passed through a displacement meter before it reaches the mixing chamber. This meter is provided with moving parts which are displaced in exact proportion to the amount of oil which flows therethrough and these parts in turn control mechanism which controls the movement of mechanism forming a part of the acid feed line to effect a positive displacement feed or control of the acid in such line in order that the volume of acid fed may be accurately proportioned to the volume of oil passing through the oil feed line. The oil and acid are thus fed to a mixing chamber in exactly controlled proportions, these proportions having been accurately measured by the displacement control of the acid by a volumetric function of the oil fed.

In the mixing chamber the oil and acid are violently agitated to effect a prompt intimate admixture thereof and this mixing operation is maintained for a sufficient length of time to afford the contact necessary to induce the sludge forming reaction.

The volume of the mixer and the rate of feed are so proportioned that the treated oil and sludge pass from the mixer to a battery of centrifugal separators as soon as this reaction has taken the desired course and before undesirable secondary reactions have had a chance to set in.

Referring to the drawings by reference characters, oil to be treated is fed to the conduit 10 by a device capable of supplying it at constant pressure, such, for example, as a centrifugal pump 11. Oil supplied through conduit 10 is passed to conduit 10' through a metering device 12 which contains a movable part or parts which are positively displaced with a frequency which is directly proportional to the amount of oil flowing through the system. Thus, referring to Figs. 6 and 7, there are a pair of cylinders 13 and 14 and a pair of cylinders 15 and 16. Within the cylinders 13 and 14 there is a double headed piston 17 comprising a head 19 engaging the walls of the cylinder 13 and a head 20 engaging the walls of the cylinder 14, these heads being interconnected by a connecting portion 21 of reduced diameter. A similar piston operates within the cylinders 15 and 16. An opening 22 is formed in the common wall 23 between the pairs of cylinders, thus forming a space 24 in the walls of the device 12 into which liquid is introduced by means of the conduit 10. In the arrangement of the apparatus every particle of liquid which passes through the pipes 10 and 10' effects a proportionate displacement of the pistons within the cylinders. To this end, a suitable valve mechanism is employed to control the flow of liquid from the space 24 between the cylinders, to the cylinders 13, 14, 15 and 16, and from those cylinders to the passage 30 which is formed in the body of the cylinder casing and from which it discharges into an opening in the hollow boss 12' to which the discharge pipe 10' of the metering device is secured. Thus, in the construction illustrated in Figs. 6 and 7, passages 26 and 27, respectively, lead to cylinders 13 and 14 from ports 29 and 28, respectively, and an intermediate port 25 communicates with discharge passage 30 leading through the wall of the cylinder casing to the interior of the boss 12' which communicates with the discharge pipe 10'. A similar arrangement of ports 35, 37 and 38 controls the flow of liquid from the space 24 into cylinders 15 and 16 and from these cylinders into the discharge passage 25 leading to the discharge pipe 10', these ports being interconnected with the cylinders 15 and 16 by passages 34 and 36, respectively.

Co-operating with the ports 28, 25, 29 and 35, 37, 38 are identical valve devices. Each of these devices consists of a movable valve member 31 having a concave lower face provided with a cavity 32 adapted to interconnect two of the ports selectively. Thus the valve device 31 illustrated in Fig. 7 of the drawings interconnects the ports 28 and 25 to permit discharge of liquid from the cylinder 14 during the discharge of oil therefrom by the movement of the piston 20 to the right and interconnects the ports 29 and 30 during reverse movement of that piston to cause the discharge from the cylinder 13. The valves are held in close engagement with the surfaces upon which they rest by the pressure of the liquid within the space 24 and this pressure may be increased by guiding the valves along spring strips 33 secured within the casing and each passing through a slot in its respective valve. These strips also restrain the valve against sidewise movement and thus not only insure a firm seating of the valve, but also serve the additional function of guiding it in its reciprocating movement. The pistons are undercut at their inner extremities to form shoulders which coact with the valve devices to abut extensions thereon, as illustrated in Fig. 7. Each of the pistons thus actuates the valve controlling ingress and egress of liquid to and from the adjacent cylinder. Thus, the piston members 19 and 20 at the lower side of Fig. 6 control the feed and discharge of liquid to and from the cylinders 13 and 14 and the members 19 and 20 at the top of that figure control the feed and discharge to and from the cylinders 15 and 16, respectively.

In accordance with the present invention the amount of acid fed in the pipes 40 and 45 to the mixer is controlled by the movement of the pistons described above. To this end, a packed valve rod 56 is passed through an opening in the wall 23 intermediate the sets of cylinders. A projection 57 is attached to this rod and extends into the path of the pistons in one of the sets of cylinders. Thus, as illustrated, the arm 57 extending from the rod 56 is adapted to be alternately reciprocated in opposite directions by the abutment of the shoulders interconnecting the reduced portion 21 of the upper piston in Fig. 6 with the heads 19 and 20 thereof. It will thus be seen that the rod 56 is reciprocated in opposite directions once for each complete cycle of the metering device; i. e., it undergoes one reciprocation every time a quantity of oil corresponding to the sum of the volumes of the cylinders 13, 14, 15 and 16 passes through the metering device. This valve stem 56 in turn controls the movement of a valve in an acid metering device which will next be described.

In Figs. 2 to 5, there is shown in more or less detail an operative construction of measuring cylinder 41 and its associated valve mechanism 44 adapted to be controlled by the valve rod 56. Acid flows from pipe 40 into valve chamber 46 which contains a valve 47, which, as shown, is of the conventional D-valve type, this valve being held upon its seat by the pressure of the liquid and also by the action of the spring 48. Within the seat of valve 47 is a port 49 which communicates with outlet pipe 45, a port 50 which communicates with one end of the measuring cylinder 41 and a port 51 which communicates with the other end of measuring cylinder 41. It will be clear that reciprocation of valve 47 along its seat places each end of the cylinder alternately into communication with the outlet pipe 45. Adjustable stop 43 is provided with a suitable packing 50' which is compressed by a nut 51. This stop extends into the cylinder 41 and limits the movement of the piston 42 therein. Index line 52 on the piston indicates the stroke, and therefore the displacement volume of the measuring cylinder 41 upon a scale 53, the cylinder being cut away in its central portion in order to make this reading visible. The piston 42 is also provided with openings 54 for the accommodation of a tool to facilitate rotation in case it binds for any reason.

In the practice of the invention valve 47 is moved in exact correspondence with the displacement of the upper piston illustrated in Fig. 6 and the frequency of reciprocation of the piston 42 of the measuring cylinder 41 is therefore exactly dependent upon the volume of liquid passed through the displacement device 12. Any suitable method and apparatus may be employed for interconnecting the valve 47 with the rod 56. In Figs. 2, 5 and 6 this valve is shown as provided with a packed valve rod 55 which is directly connected to the rod 56 extending into the metering device 12.

It will be seen that in the operation of the apparatus so far described successive increments of oil fed through the meter 12 control the feed of proportionate successive increments of acid which pass through the cylinder 41, and that the proportion between these constituents may be varied by an adjustment of the screw 43. The acid and oil are then passed through conduits 45 and 10' to a multi-stage mixer 70. The nature of the operation performed by this mixer on the oil and acid constitutes an important feature of the invention and is believed to be in large measure responsible for its success as contrasted with the failure of prior efforts to effect a high speed continuous acid treatment of petroleum oils. The mixer is of the high-speed type adapted to subject the constituents to a shearing action to violently agitate them and thus effect a very fine sub-division of the acid particles. It is important that the mechanical agitation shear the acid particles with sufficient violence to disperse them in very fine form in the oil, as the facility with which the acid particles can remove impurities is a direct function of their total superficial area. The mixer may, for example, be of a high-speed rotary type adapted to effect a violent agitation of the constituents to promptly and intimately admix them and maintain them intimately admixed while the sludge-forming reaction takes place. After the mixing operation the constituents are passed to a battery of centrifuges 72 through conduits 71 and 73 and valves 74. The sludge and sour oil are separated in these centrifuges and led to separate receiving vessels.

The sour oil discharged from the centrifuges may be given such subsequent treatment as is necessary to produce a finished product. Thus, it may be air blown to remove residual dissolved vapors of sulphur dioxide. This may be performed by a batch or continuous treatment. The oil may, for example, be passed down through a bubble tower in counter-current flow with respect to a current of air. The oil may be thereafter subjected to neutralization and decolorization treatments, and, in the case of wax bearing oils, be centrifugally dewaxed.

In order to effect the desired improvement of the color and composition of the oil in the practice of the invention, it is important that the violence of treatment and the length of contact of the constituents be accurately maintained in order to avoid inadequate acid treatment on the one hand and discoloration of the oil and formation of undesired reaction products on the other. To this end it is important that the violence of agitation be sufficiently high to promptly effect the desired mixing intimacy and to maintain this intimacy during substantially the entire treatment period. As an example of the practice of my invention, it has been found that the application of power to the mixer at such a rate as to perform from 0.4 to 2.8 B. t. u. of work per pound of oil gives excellent results when the total contact period is limited to less than four minutes. When agitation of this order is applied, best results are obtained when contact is not substantially over two minutes, although contacts of from two to four minutes may be employed without very serious damage to the oil. The total contact period may be limited to approximately one minute if sufficiently violent agitation is maintained. The application of power to the mixer at a rate adapted to perform the amount of work specified in the contact period indicated affords a very prompt mixture of the constituents and it is important in the practice of my invention that this application of power be continued during substantially the entire contact period in order that this intimacy may be maintained.

In an illustrative example of the practice of the invention, the following procedure was employed. A steam refined cylinder stock was obtained from Mid-Continent petroleum by distillation with fire and steam. This oil had the following characteristics:

| | |
|---|---|
| Gravity | 21.4 A. P. I. |
| Flash | 510° F. |
| Fire | 600° F. |
| Vis. S. U. at 210° F. | 166' |
| Pour test | 88° F. |
| Color | 12400 T. C. U. |

(See Industrial & Engineering Chemistry, vol. 22, p. 1293).

The stock was continuously passed through a steam heated pipe heater to heat it to a temperature of 140° F. It was thereafter passed through a gravity air separator to effect the separation of any free air which it might contain. It was then passed through a metering device similar to that illustrated at 12 in the drawings and flowed from this metering device through a pressure regulating valve adapted to maintain a constant pressure in the subsequent steps of the process. The oil was passed from this valve to a high-speed mixer, such as illustrated at 70 in the drawings.

98% sulphuric acid was flowed by gravity through a valve mechanism similar to that illustrated at 44, to a measuring cylinder, such as illustrated at 41, the parts of the valve mechanism and measuring cylinder being controlled through a valve rod, such as that illustrated at 56, connected to the metering device 12 in the manner shown in the drawings. Acid was passed from the cylinder 41 to the mixer in accordance with the general method described above, the piston 42 in the cylinder 41 feeding this acid in increments exactly proportioned to the increments of oil fed through the metering device 12. The screw 43 was adjusted to deliver sulphuric acid in the proportion of 45 pounds of acid to each 42 gallon barrel of oil.

Two mixers were used in series with a total liquid content of 15 gallons. The oil and acid mixture after passing through the mixers was passed directly to a battery of 7 Sharples Super Centrifuges equipped with separator bowls of approximately 4⅛" inside diameter and 30" length, operating at a speed of 15,000 R. P. M. In these super centrifuges the mixture was separated into sour oil and sludge. The sour oil and sludge were discharged continuously from the super centrifuges.

Oil was fed through the system at a rate of approximately 14 gallons per minute, and the size of the mixers was such that the total period of time required for any given particle of oil-acid mixture to pass through the mixers was approximately one minute.

The power consumed in driving the two mixers was 180 B. t. u. per minute or approximately 1.7 B. t. u. per pound of oil passing through the mixer.

The sour oil discharged by the super centrifuges amounts to 78% of the volume of the steam refined cylinder stock fed to the process. By the old process of agitating acid with oil by air agitation and allowing the sludge to settle by gravity in connection with the same stock, the yield of sour oil over a long period of time averaged 68% of the volume of steam refined cylinder stock used. The use of the process of the present invention thus represented a 10% increase in yield.

The sour oil as discharged from the super centrifuges was further neutralized and decolorized by adding 10% by weight of X. X. F. Attapulgus clay and heating to 450° F. while blowing steam through the mixture. The mixture was then filtered to remove the clay. The resulting oil had the following characteristics:

| | |
|---|---|
| Gravity | 25.3 A. P. I. |
| Flash | 510° F. |
| Fire | 600° F. |
| Vis. S. U. at 210° F | 113" |
| Pour test | 105° F. |
| Color | 320 T. C. U. |

This product was next passed through the dewaxing operation for the manufacture of a steam refined bright stock.

In other examples of the practice of the invention, the intensity of agitation has been varied to perform work at a rate as small as 0.4 B. t. u. and as high as 2.8 B. t. u. per pound of oil, with satisfactory results. Where the agitation was at a rate of less than 0.4 B. t. u. or greater than 2.8 B. t. u. per pound, however, the finished product did not give a satisfactory color upon clay neutralization. Tests have been conducted covering the entire range between 0.2 and 6 B. t. u. per pound. The very best results have been obtained between 0.6 and 1.8 B. t. u. per pound.

From the above discussion, it will be seen that the invention contemplates the accurate volumetric proportioning of the constituents and that such proportioning is obtained by measuring the volume of one constituent fed to the mixer by means of a displacement function of the other. It will be further seen that the invention contemplates the application of violent mechanical agitation to the constituents to effect the mixture and maintain the intimacy so obtained during the reaction period and that such reaction is followed by a prompt separation of the constituents by the application of centrifugal force. While the employment of a brief ageing period is contemplated within the spirit of the invention in certain cases, such ageing should never be maintained for a substantial length of time.

It will be further seen that my method avoids the objectionable discoloration incident to air blowing or other methods involving oxidation of the oil and/or unduly prolonged contact between the oil and acid. While I have illustrated a particular proportioning device for effecting the volumetric control desired, it will be obvious that other devices may be substituted. An example of a second such device is that illustrated in my co-pending application Serial No. 636,167, filed October 4, 1932.

While I have described a specific mechanism and a specific method for practicing the process of the invention, it will be obvious to those skilled in the art that other methods and mechanisms may be utilized in this connection and I do not therefore intend to be limited except by the scope of the subjoined claim as interpreted in the broad spirit of the invention.

I claim:

A continuous process of chemically treating petroleum oil that comprises continuously passing into confluence an oil of the nature of cylinder stock and concentrated sulphuric acid in amounts accurately proportioned by volume, the exact proportion being set by experiment with the oil to be treated but being in the general range of 42 gallons of oil to 45 pounds of acid, intimately mixing said oil and acid during a period of around one minute at a rate that will require around 1.7 B. t. u. of work per pound of oil treated and thereafter separating the treated oil from the sludge formed by means of centrifugal force.

LEO D. JONES.